March 3, 1942.   A. M. DRAVING   2,275,058
ANCHORING DEVICE
Filed June 3, 1939   2 Sheets-Sheet 1
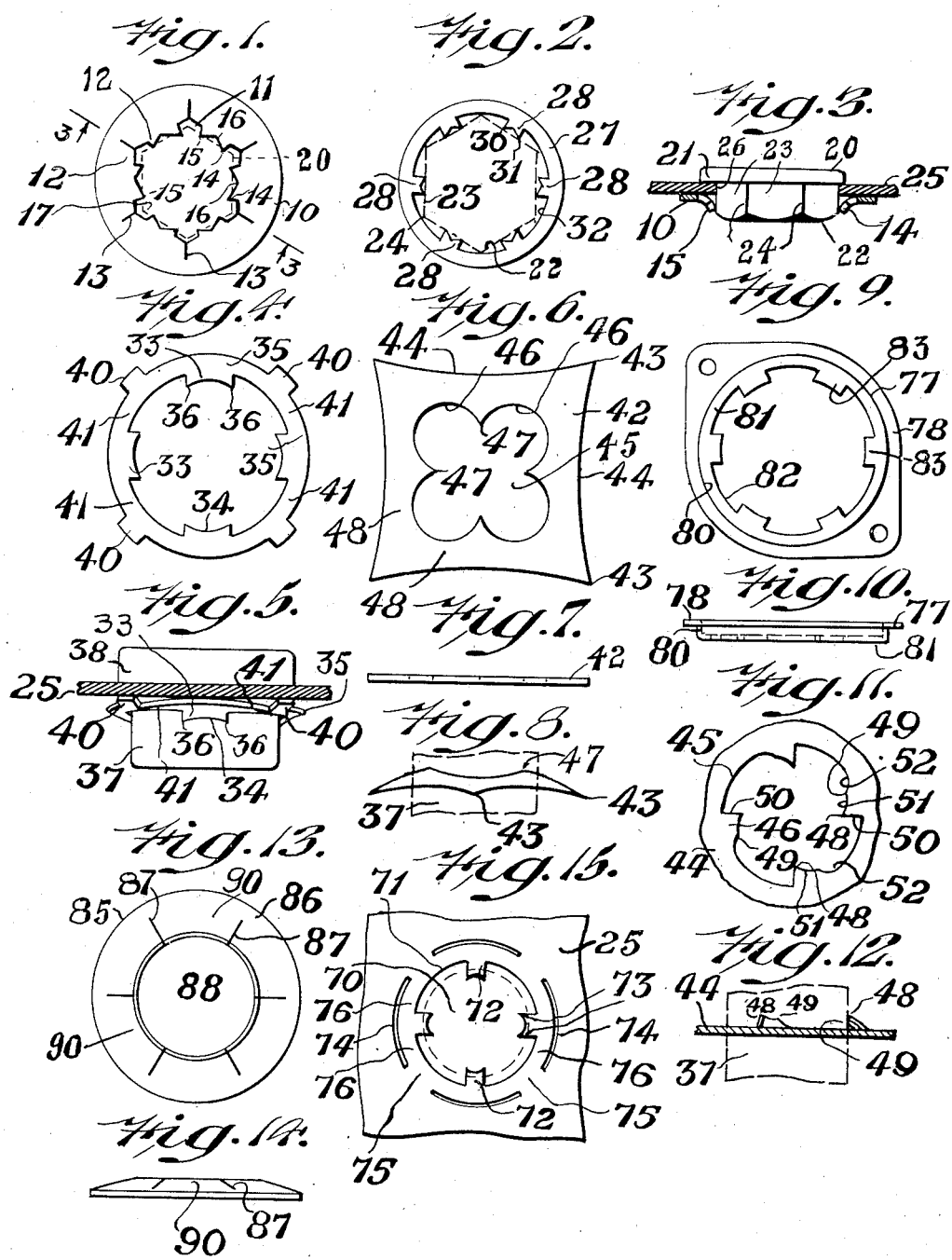
INVENTOR
ARTHUR M. DRAVING,
BY
Frank H. Borden
ATTORNEY

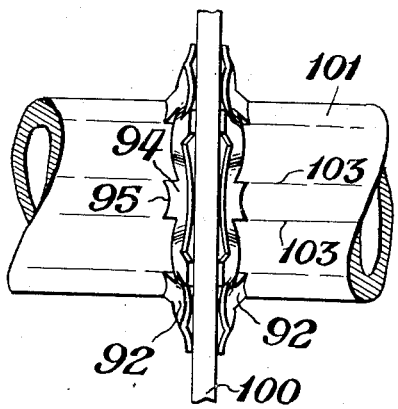
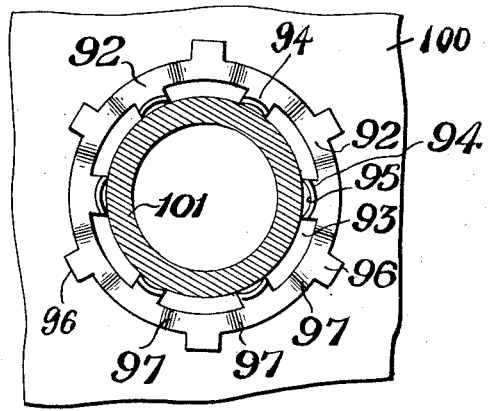
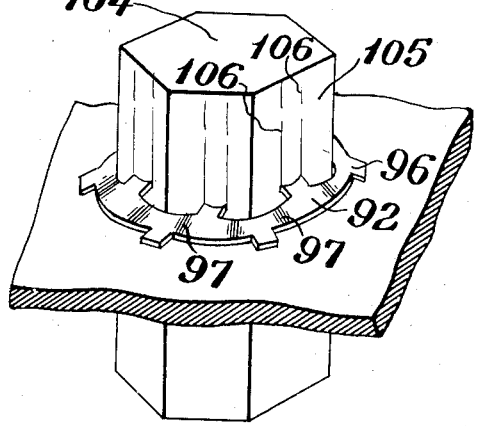
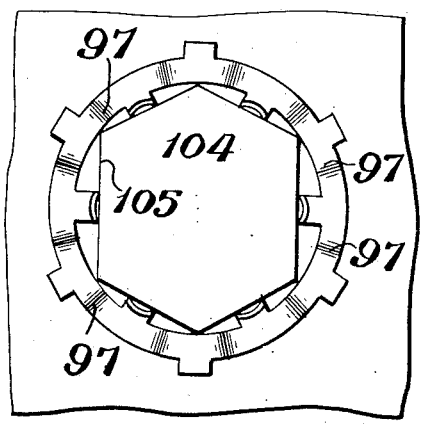

Patented Mar. 3, 1942

2,275,058

UNITED STATES PATENT OFFICE 2,275,058

ANCHORING DEVICE

Arthur M. Draving, Feasterville, Pa., assignor to Hugh H. Eby, Inc., Philadelphia, Pa., a corporation of Pennsylvania Application June 3, 1939, Serial No. 277,205

7 Claims. (Cl. 85—36)

This invention relates to anchoring devices, and particularly to devices for anchoring an axially movable element relative to a stationary apertured element in which the movable element is slidable. This application constitutes a continuation in part of application No. 218,754, filed July 12, 1938.

It is among the objects of the invention; to provide an anchoring device arranged for quick and facile frictional engagement on a slidable member to prevent its axial movement in one direction; to improve the art of anchoring devices; to provide a simplified and inexpensive anchoring device of general applications; to provide an anchoring device as an integral portion of an apertured panel to anchor inserted elements against axial thrust; to provide an anchoring device having individual spaced friction tongues; to provide an anchoring device having a friction tongue arranged for resilient engagement with the element to be anchored as a resultant of bending the tongue axially of the thrust line of the anchored element and also of torsional bending of the tongue or its support; to provide an anchoring device with a gripping tongue engaging the element as a function of twist of the tongue along its length; to provide an anchoring device combined with a mounting panel whereby the movable element is locked to the panel and the latter can be positioned and secured on an ultimate support; to provide an aperture in a panel with which an inserted element is automatically self locking; and many other objects and advantages will become more apparent as the description proceeds.

In the accompanying drawings forming part of this description:

Fig. 1 represents a plan of a form of anchoring ring according to one form of the invention.

Fig. 2 represents a plan of a modified form of anchoring ring having an interior arranged to frictionally engage an illustratively hexagonally contoured inserted element, such as a socket for plug-in devices.

Fig. 3 represents a transverse vertical section, partially in elevation, of a socket element for a plug-in device having a polygonal mounting extension below a positioning flange, disposed in a panel and held against axial retraction by the anchoring ring of Fig. 2.

Fig. 4 represents a plan of a modified form of anchoring ring in which the frictional engagement of the tongues is due at least in part to torsion of the mount or support for the tongues.

Fig. 5 represents a side elevation of the ring element of Fig. 4 engaging internally a socket element disposed in a panel shown in section and engaging externally the panel to exert resilient torsion on the socket to maintain an anchoring frictional lock therefor.

Fig. 6 represents a plan of a further modified form of torsionally actuated anchoring device.

Fig. 7 represents a side elevation of the ring shown in Fig. 6.

Fig. 8 represents a side elevation of the ring of Fig. 6 distorted in its locking engagement with an element shown in dotted lines.

Fig. 9 represents a plan of a further modified form of anchoring device operatively associated integrally with a mounting element.

Fig. 10 represents a side elevation of the depressed ring of Fig. 9, partially in dotted lines.

Fig. 11 represents a plan of a further modified form of the central part of an anchoring ring or of the edge of the aperture of a mounting panel.

Fig. 12 represents a fragmentary section of the device of Fig. 11 in operative exaggerated engagement with an axially inserted element, to indicate the torsional grip of the tongue.

Fig. 13 represents a plan, and

Fig. 14 represents a side elevation of still further modified form of the invention.

Fig. 15 represents a fragmentary plan of an apertured mounting panel arranged to impart torsional resilience to the inturned tongues.

Fig. 16 represents a side elevation of a mounting panel with a fragmentary axially inserted cylindrical element disposed perpendicularly therein, with a pair of modified forms of anchoring rings disposed back-to-back on the panel to prevent any axial movement of the element.

Fig. 17 represents a fragmentary plan of the panel of Fig. 16, with the engaged cylindrical element shown in section, and with the modified form of anchoring ring shown in plan.

Fig. 18 represents a fragmentary perspective of a panel with a polygonally contoured element mounted therein, showing that the anchoring device of Figs. 16 and 17 is equally effective for anchoring hexagonal elements as for round ones.

Fig. 19 represents a fragmentary plan of the assembly of Fig. 18.

Fig. 20 represents a fragmentary plan of a mounting panel having a modified aperture contoured like the inside of the rings shown in Figs. 2 and 19.

Fig. 21 represents a further fragmentary plan of a mounting panel aperture, a modification of the form shown in Fig. 11.

It will be understood that while any sorts of objects can be used with the anchoring devices, the best results are obtainable with molded materials, such as phenolic resins and the like, although certain metals are available if they are not too hard.

Referring to Fig. 1, a ring 10 is disclosed which may have the annular outer periphery or contour shown, or may be provided with externally projecting elements such as tongues as will hereinafter appear. The ring 10 has a central aperture 11, defined by a plurality of friction tongues or furcations 12, separated by radial slots 13 so as to be independently flexible, and each in its substantial center has the inwardly directed bifurcation or spaced angularly divergent engaging points 14 and 15, separated by the outward divergence 16. It will be observed that the angular divergences 16 are at approximately 120° so that if desired a hexagonal shank the angles of which correspond, may be moved axially of the ring of Fig. 1, with each angled corner sliding in the angled divergence 16 so as to exert purely frictional engagement therewith. If the angle at 16 is slightly greater than that of a hexagon corner then the frictional bite will be on the corner itself. On the other hand the divergence may be more acute than the angled corner of the hexagon so as to bring the points 14 and 15 into biting engagement with the faces adjacent to the given angled corner. On still a different procedure the hexagonal element may be axially inserted so that the corners extend into the spaces 17 between tongues or furcations while the flat faces of the hexagon each engage both points 14 and 15 of a given tongue or tooth. For many reasons this latter course is preferred and is substantially illustrated in Fig. 3. It is to be observed that the device of Fig. 1 may be disposed in an outer ring or it may be formed in a mounting panel as the aperture therein, as is also possible with the other figures herein, except as they may later be qualified as possessed of elements or attributes peculiar to rings alone.

Referring to Fig. 3 there is shown in side elevation a molded socket receptacle 20 having the upper flange 21 and the lower hexagonal shank 22 provided with substantially planar faces 23 meeting at corners 24, each parallel to the other and to the axis of the socket. A mounting panel 25 is provided with an aperture 26 such as to receive the shank 22 of the socket. Whether it be hexagonal also to prevent angular motion, or merely round to permit same but prevent axial thrust or motion, under the broader guises of this invention, makes no particular difference.

After the socket has been pushed into the hole 26 in the panel 25 until the flange 21 abuts the top surface of the panel, the locking ring of Fig. 1 is forced axially upon and longitudinally of the shank 22 until the peripheral portion 10 thereof abuts the lower surface of the panel. At this juncture the respective radial tongues 12 having the scarifying spaced tips 14 and 15 will have engaged the respective flat faces 23 and preferably will have been slightly deformed axially thereby and will have bitten into them or at least will have established such frictional grip with them that axial retraction is substantially precluded. In anchoring engagement, preferably, the anchor will have been distorted into a substantial cone, if initially planar. In the slightly modified form of the invention of Fig. 2, the ring 27 shown in concentric relation to the hexagonal shank 22 has the radial tongues 28 which are arcuately spaced, and the inner periphery of the ring at 32 is so disposed that the corners 24 of the shank 22 have clearance so that the entire engagement of the shank and the ring is by the spaced tips 30 and 31, of the tongues engaging the respective flat walls 23. It will be observed that the time and effort required to anchor the parts of either Figs. 2 or 3 will be inconsequential.

By reference to Fig. 20 it will be observed that the panel 25 may have its aperture provided with the tongues disclosed to facilitate direct anchoring of the socket device into such panel. The tongues are exactly like those of Fig. 2 and bear the same characters, as will be understood.

Referring to Figs. 4 and 5 there is disclosed a modification of the devices of Figs. 1, 2 and 3, which has an added degree of resilient bite in the fact that the inturned tongues or fingers 33, may have biting or engaging faces or edges formed on an arc on a radius less than that of the ring 35, as at 34, so as to present two spaced points as at 36 for improved frictional engagement with a cylindrical or other shank 37 of the socket 38 shown in elevation in Fig. 5. The inturned radial tongues or fingers 33 are preferably circumferentially spaced from the external substantially radial lugs or ears 40, and the arcuate portion 41 between the internal and external ears is arranged for flexation about an axis extending substantially arcuately between the respective adjacent ears 40 and 33. Usually two adjacent arcuate portions 41 flex together with the intermediate internal tongue 33. When the socket 38 is dropped axially downwardly into the aperture 26 of the panel portion 25, it moves with freedom until the upper flange of the socket abuts the panel face. The anchoring ring of Fig. 4 is then slid axially over and upon the shank 37. The several diameters or radii of or between the tongues, ring and shank being such that the engagement of the tongues upon the shank bends the tongues axially relative to the ring 35, while also bending the flexible arcuate portions 41 in torsion in one direction, while through reaction due to torsion of adjacent arcuate strips 41 flexing together with an intermediate external tongue 40, the external lugs 40 are bent in the other axial direction to engage against the under side of the panel 25 and extend substantially beyond the periphery of the ring, both axially and radially from the support for the ring in its engagement with the panel. This also secures appreciable room for torsional flexing and bending to develop a maximum resilient bend between the extremities of the internal and external lugs, ears, tongues, points or teeth, whichever may be used.

It will be obvious that the principle of the added resilience as a function of torsion may be secured in many different ways, of which a few are illustrated and hereinafter described. Thus, referring to Figs. 6, 7 and 8, there is disclosed a substantially flat stamping, 42 which has a predetermined number of angular corners 43 (illustratively four), formed by slightly concave side edges 44 meeting in angles of less than 90°, in the preferred embodiment. Internally the stamping has a substantially clover-leafed aperture 45 formed of a plurality of recesses 46. The surfaces defining the aperture meet in the internally directed shank-engaging points 47, preferably angularly or circumferentially evenly spaced or staggered between the external corners 43. It will be appreciated that when the stamping 42 is slid axially upon a shank 37 of slightly greater diameter than the diameter of the aperture 45 between diametrically spaced points, the stamping will have been distorted to substantially the position shown in Fig. 8, and the resilient bite will be as a resultant of the bend of the points 47 and the torsional stressing of the generally circumferentially extending material 48 between adjacent inner points 47 and external points 43.

It may be noted in passing that the anchoring devices may be stampings or the like that are initially in a plane, and only become distorted after being stressed, or they may be initially conoidally formed and merely have an added bending provided by the association with the shank to be anchored. These remarks apply also, of course to the other forms of anchoring devices to be described. It is contemplated also that all of the internal tongue and aperture formations shown or to be described may if desired, be formed in a panel as well as in an independent ring element.

A modified form of torsional engagement is securable from the anchoring ring or panel 44 of Figs. 11 and 12. The outer portion has been shown broken away, as for the practical purposes of anchoring, it makes but little difference whether this is an individual ring having an annular periphery or one that has external lugs, or whether it is a formation of panel aperture, with which a shank 37 is associated. An aperture 45 is provided from which a plurality of internal or inwardly directed teeth or points 46 arises, each preferably having radially a high point 48 at the termination of a generally radial tooth edge 50, and the other side of the tooth or points returns to the peripheral level or extent of the aperture 45 preferably by the sloping intersecting arcs 51 and 52. This furnishes spaced teeth points 48 and 49 on each tooth 46. As shown in the disclosure of Fig. 12, the entry of the shank 37 into the aperture 45 bends the teeth 46 axially. Owing to the asymmetrical shape of the teeth, each deformation of a tooth is as a resultant of distortion axially, and also as a bend about a line of torsion angularly divergent from the radial of the anchor, through the respective teeth. Mention might be made at this time of the disclosure of the analogous form of the invention shown in Fig. 21, in which the panel or ring 60 has an internal aperture 61 into which a plurality of teeth 62 extends as at 63. One side of each tooth is formed of a line edge 64 which is angularly divergent from a radius, so that the tooth overhangs such radius while the other side 65 is formed of intersecting arcs 66 and 67 thereof meeting in a scoring high point 69 and with arc 66 meeting the edge 64 in a point 59. The torsional bending effect of distorting such teeth will be obvious from what has preceded.

The torsional component of resilient stress of the tongues or teeth is not restricted in its existence to the individual anchoring ring, as has been mentioned, and an excellent illustration of its use in a mounting panel is found in Fig. 15. In that disclosure the panel 25 has a recess 70, from the wall surface 71 of which the tongues 72 extend inwardly substantially radially to termination in the scoring edges 73. At suitable spaced points a series of circumferentially aligned relatively short arcuate slots or slits 74 are disposed in the panel in spaced relation to the surface 71 thereof, there being a slot behind each tongue, and the slots terminating in spaced relation, with the spaces defining substantial or effective supporting tongues or continuous ears 75, between which and the internal tongues the relatively narrow ribbons of metal 76 extend, analogous to the portions 41 of Fig. 4, susceptible to torsional flexation to impose an added increment of stress to the stress of the deflected tongues per se, when they are engaged and more or less distorted by the inserted shank 37, shown in dotted lines in Fig. 15.

Referring now to Figs. 9 and 10, there is disclosed a cupped mounting ring 77, having a flange 78, which may be annular, or oval to afford two mounting ears at the extremities of the ring, having the axially extending wall 80, substantially perpendicular to the plane of the flange 78, and at the lower end having a restricted foot portion 81 generally normal to the wall 80 and of limited radial extent, so as to define an axial opening 82 into which integral anchoring lugs 83 extend for frictional engagement with an inserted shank. The tongues or lugs 83 may have an initial inclination relative to the wall 80. It will be observed that the device of Figs. 9 and 10 provide an under-panel mounting by which sockets can be disposed with their upper surfaces substantially flush with such panels, and the manifold uses of such depressed rings or mounting cups, will be understood.

In the modification shown in Figs. 13 and 14, a dished or generally conoidal stamping 85 is provided having a substantially solid external ring 86 into which radial slots 87 extend to define with the internal aperture 88 anchoring tongues 90. The straight frictional grip securable from the device of Fig. 13 when slid axially upon a polygonal or cylindrical shank will be understood.

It may be noted in this connection that the use of a polygonal shank, say of hexagonal contour, presents one face to each tongue especially as the tongues are distorted axially under pressure, and are therefore separated at the free ends thereof, which, because of the internal or biting contour of the edge will contact such face substantially at two spaced points, with an enhanced bite or grip.

The use of the anchoring devices according to the various embodiment will be clear, and the modifications that may be resorted to will also be clear. The ring device of Figs. 4 and 5 may be provided with any number of internal or external points or lugs or tongues, as will be obvious, as will the fact that the shanks to be engaged may alternatively be cylindrical or polygonal (which is true of all of the devices shown). For illustrations of slightly modified forms of anchoring rings and the various elements to be fastened thereby, reference may be had to Figs. 16 to 19 inclusive. In those figures a ring 92 has the inner aperture 93 into which a plurality (illustratively six) tongues 94 extend in preferably evenly spaced peripheral relation, and each has an arcuate edge 95. The ring carries the external substantially radial ears or lugs in staggered relation to the internal teeth or tongues, as at 96, in such relation that the relatively short arcuate extent of ring at 97 is arranged for torsional deflection, with the same functioning as in the earlier described figures. The rings may be initially planar or may be slightly crimped or waved in the peripheral extent of the ring, or may be initially slightly conoidal in outline, or mixtures of these several features may be resorted to.

As shown in Fig. 16, with a mounting panel 100, through an aperture in which a cylindrical pipe or shank 101 extends perpendicularly, one of the rings 92 may be slid axially over each end of the shank to abutting engagement against the panel, to lock the unflanged shank against any axial movement relative to the panel. The relation of the parts is such that the arcuate biting edges present two spaced scoring edges which, in material susceptible to such scoring, may form two lines of frictional engagement as indicated in dotted lines at 103. It is to be understood that the scoring effect of the spaced points is secured whenever the shank has either substantially flat faces or a curved face which has a greater radius than that of the arcuate scoring edge.

As shown in Figs. 18 and 19, with the same panel and anchoring rings, a hexagonal shank 104 is provided having six identical faces 105, with which the spaced points of the respective tongues form effective scoring engagements possibly forming scoring lines as indicated at 106, in material soft enough to show them. Obviously if desired, mere frictional engagement without marking the shank may equally well be secured if desired.

I claim as my invention:

1. In anchoring devices in combination, a mounting panel having a surface and an aperture, a shank mounted axially in the aperture, a flat anchor encircling the shank and having spaced internal teeth deflected out of their initial flat relation by the shank, said anchor having spaced external teeth disposed wholly in and being peripherally smaller than the space between the internal teeth and deflected out of their initial flat relation to engage the panel surface, said internal teeth being disposed wholly within and being peripherally smaller than the respective spaces between the external teeth.

2. A fastener comprising a sheet metal body portion, an annular series of radially disposed integral resilient tongues on said body portion having their free ends spaced from each other to provide an aperture, and a tooth having a pointed end formed on the free end of each tongue.

3. A fastener comprising a spring tempered sheet metal body portion, an annular series of radially disposed converging resilient tongues adapted to flex to frusto-conical form upon engagement by a stud, and a plurality of teeth on the free end of each tongue having pointed ends and adapted intimately to engage the stud to which the fastener is applied.

4. A fastener comprising a spring tempered sheet metal body portion, an annular series of radially disposed converging resilient tongues adapted to flex to frusto-conical form upon engagement by a stud, and a plurality of teeth on the free end of each tongue having pointed ends and adapted intimately to engage the stud to which the fastener is applied, said teeth being formed by notching the free end portion of each tongue to form a pair of laterally spaced teeth adjacent the side edge of each tongue.

5. An anchoring device comprising an apertured annular metal body having a plurality of inwardly disposed integral tongues spaced about the aperture of said body, an object-biting tooth on each tongue, and integral means, projecting from the body edge opposite to said tongues, for supplementing by a torsional resistance the normal bending resistance of said tongues, said means functioning in engagement with a fixed part.

6. An anchoring device comprising an apertured annular metal body having a plurality of inwardly disposed integral tongues spaced about the aperture of said body, an object-biting tooth on each tongue, and integral means, projecting from the body edge opposite to said tongues and staggered circumferentially with respect to said tongues, for supplementing by a torsional resistance the normal resistance to bending of said tongues, said means functioning in engagement with a fixed part.

7. An anchoring device comprising an apertured annular metal body, tongues peripherally spaced about said body with spaces between tongues of appreciably greater peripheral extent than the width of the respective tongues, each tongue having an object-biting edge surface, and external lugs projecting from the body edge opposite to said tongues in peripherally spaced relation, the spacing between the external lugs being appreciably greater peripherally than the width of the respective lugs, each external lug being disposed wholly within and of smaller peripheral extent than the space between respective inwardly disposed tongues, the respective inwardly disposed tongues being disposed wholly within and of appreciably smaller peripheral width than the appropriate space between external lugs whereby flexure of the inwardly disposed tongues in one direction out of the plane of the body causes torsional twist of the body between each inward tongue and the respective adjacent external lugs to enhance the resilient bite of said tongues.

ARTHUR M. DRAVING.